United States Patent [19]

Gall

[11] 4,075,662
[45] Feb. 21, 1978

[54] METHOD AND SYSTEM FOR COMPENSATING THE NON-LINEARITIES IN A REPRODUCTION PROCESS

[75] Inventor: Winrich Gall, Klausdorf, Germany

[73] Assignee: Dr. -Ing. Rudolf Hell GmbH, Postfach, Germany

[21] Appl. No.: 693,938

[22] Filed: June 8, 1976

[30] Foreign Application Priority Data

June 13, 1975 Germany .............................. 2526409

[51] Int. Cl.² .............................................. H04N 1/40
[52] U.S. Cl. ..................................... 358/280; 358/78; 358/80; 358/296; 358/302
[58] Field of Search ............... 358/280, 283, 298, 299, 358/296, 302, 78, 80

[56] References Cited

U.S. PATENT DOCUMENTS

| | | | |
|---|---|---|---|
| 3,800,079 | 3/1974 | McNeil | 358/160 |
| 3,869,698 | 3/1975 | Trost | 340/146.3 AG |
| 3,890,596 | 6/1975 | Beun | 340/146.3 MA |
| 3,894,217 | 7/1975 | Ebukuro | 235/61.11 E |
| 3,916,098 | 10/1975 | Vandling | 358/281 |
| 3,922,546 | 11/1975 | Livesay | 250/310 |
| 3,922,711 | 11/1975 | Sasabe | 358/75 |

*Primary Examiner*—Howard W. Britton
*Attorney, Agent, or Firm*—Ernest F. Marmorek

[57] ABSTRACT

A method of calibrating a reproduction apparatus having a sensor device for generating sensor signals by optically scanning a picture original and a recording device controlled by recording signals for recording the picture original on a film, comprising the steps: generating a set of first signals for said recording device to produce a sample gray scale on the film having a predetermined first range of gray scale values; generating and storing a set of second signals corresponding respectively to said first signals; generating a set of third signals corresponding substantially to the gray scale values of said sample recorded gray scale; correlating said third signals to said first signals; generating a set of fourth signals representing a predetermined second range of gray scale values of a reference gray scale; substantially correlating a first group of at least some of said fourth signals to a second group of at least some of said third signals for obtaining said second signals; and storing said second signals in a storage device having addresses corresponding to the fourth signals of said first group, whereby a substantially generated sensor signal for a given gray scale value by the picture original can be used to select a recording signal from a stored second signal of said second group by a correlated fourth signal suitable for obtaining a substantially duplicate gray scale value.

The invention also relates to a system for calibrating the reproduction apparatus.

9 Claims, 6 Drawing Figures

METHOD AND SYSTEM FOR COMPENSATING THE NON-LINEARITIES IN A REPRODUCTION PROCESS

BACKGROUND OF THE INVENTION

In the following, the operation of a color scanner will be described and its general functions and objectives are also explained.

In a color scanner, the color picture is placed on a rotatable scanning drum. A scanning device which is adapted to move axially with respect to the scanning drum scans the picture point by point and along the plurality of lines into which the picture is subdivided as it moves along. In the scanning device, the scanning ray is subdivided into three component rays. The component rays each have an associated color filter for separating the colors and opto-electrical transducers in order to produce three distinct signals.

The color signals, after they have been operated on by a logarithm operator, correspond to the scanned color density and are fed into a color operator in order to provide a color correction. The corrected color signals are fed into a recording unit. The recording unit includes a correcting stage for compensating the non-linearity and a recording lamp having a brightness or intensity modulated by the corrected color signals.

The recording lamps expose a film mounted on the recording drum point by point and line by line.

The exposed and developed films received are the desired color separations: magenta, cyan and yellow.

In order to calibrate the color correction and contrast adjustement for the reproduction apparatus, it is necessary that there be a measurable estimate of the properties of the film even before the film is exposed. An estimate of the film densities for a reference gray scale is supplied by the corrected color signals. The film density may, for example, be obtained by measuring the voltage of the color signal with a voltage meter which is calibrated for the range of the density values and placed at the output terminals of the color operator.

At this stage, the functional relationship between the film densities of the reference gray scale and the actual film densities on the exposed and developed film is not linear due to the non-linearities of both the film and the recording lamp.

The graphical representation of the non-linearities of the film is called film contrast or gradation and it will be identified herein as the characteristic film curve. Such a curve shows the non-linear relationship between the obtained film densities and the logarithm of the light quantity affecting the film. The general character of the film curve is influenced substantially by the properties of the film, by the developing process and its parameters, the composition and concentration of the developer itself, the developing time, and the developing temperature, as well as by the movement of the film during the developing and drying. In the event only one of the parameters changes, then the general shape of the characteristic film curve will also change.

By the employment of automatic developing devices in which the developing temperature is kept constant and the developer is regenerated and moved, even after a long operating time, a stabilization of the developing process is still possible. However, the stabilization, at least at the initial phase after longer periods of non-use, is unsatisfactory, because the shape of the characteristic film curve becomes changed. The characteristic film curve always is different for films having a different emulsion number or a different type of processing is used.

Generally, there is a non-linearity of a recording lamp between its brightness and the control current driving the lamp. In order to compensate for this non-linearity in the case of a known color scanner, a function generator is provided and is placed between the volt meter indicating the desired film density and the recording lamp, that is, in the path of the color component signals.

With such function generator, there is formed a compensating or correcting function having a polygonal shape in which the steepness or slope of the individual segments and the break in the line can be set by a plurality of regulators.

In order to set the correction or compensating function in a known color scanner, first the non-linearities have to be obtained. In such apparatus, a sample gray scale or wedge is exposed onto the component film or on a film having the same gradation value by feeding a plurality of voltage signals into the input of the recording unit. The obtained film densities of the individual gray shades of the sample gray wedge are measured by means of a densitometer and the measured values are recorded graphically as a curve as a function of voltage. After the curve has been obtained, the compensating function is established in the function generator.

To this effect, to the input terminals of the function generator, sequentially, different voltage values are fed and the voltage values are selected in such a manner, for example, that the densitometer coupled to the input terminals of the function generator will indicate sequentially the desired film densities of the reference gray wedge between 0.1 through 2 in steps of 0.1.

For each indicated film density, the associated voltage value is obtained from the recorded curve. If the recording lamp is supplied with such voltage values, then the obtained film density will correspond to the reference gray wedge film densities.

The contribution of the operating personnel will amount only to the setting up of a correction function with the help of the regulator of the function generator in such a manner that for each indicated film density, a corresponding voltage value will appear at the output of the function generator which has been obtained from the curve.

Then the correction function becomes approximated in such a manner that the non-linearity on the signal path of the color component signals become compensated.

Inasmuch as the regulators used will influence each other, the alignment process must be repeated several times.

The correction for non-linearities as mentioned above must be performed each time a different type of film is used or when the new film used has an emulsion number which is different from the previous one. In addition, in practice, a calibration must be made at least once a day in order to control the developing process. The alignment process takes about an hour.

There are scanners known in which only the density indication is made linear. For this reason, the function generator is arranged before the densitometer and the color component signals delivered from the color operator are directly fed to the recording lamp.

The above discussion shows that the frequency and the time spent on correcting non-linearities will result in the loss of a great deal of the useful time of the color scanner. The known method and processes are in addition not very accurate, inasmuch as the correction curve is constructed from only a few measured points.

SUMMARY OF THE INVENTION

It is, therefore, an object of the present invention to provide a novel method for compensating for the non-linearities in a reproduction process which also eliminates the above described disadvantages of known methods.

It is another object of the present invention to provide a novel method of the above kind which is fully automatized and standardized and at the same time, will result in greater accuracy in a shorter time of operation than the known methods.

Another object of the invention is a method of calibrating a reproduction apparatus having a sensor device for generating sensor signals by optically scanning a picture original and a recording device controlled by recording signals for recording the picture original on a film, comprising the steps:

generating a set of first signals for said recording device to produce a sample gray scale on the film having a predetermined first range of gray scale values;

generating and storing a set of second signals corresponding respectively to said first signals;

generating a set of third signals corresponding substantially to the gray scale values of said sample recorded gray scale, correlating said third signals to said first signals;

generating a set of fourth signals representing a predetermined second range of gray scale values of a reference gray scale, substantially correlating a first group of at least some of said fourth signals to a second group of at least some of said third signals for obtaining said second signals; and storing said second signals in a storage device having addresses corresponding to the fourth signals of said first group, whereby a substantially generated sensor signal for a given gray scale value by the picture original can be used to select a recording signal from a stored second signal of said second group by a correlated fourth signal suitable for obtaining a substantially duplicate gray scale value.

The foregoing and other objects of the present invention will become apparent as the following description proceeds and features of novelty which characterize the invention will be pointed out in particularity in the claims affixed to and forming a part of this specification.

BRIEF DESCRIPTION OF THE DRAWINGS

The present invention will become more readily apparent from the following description of preferred embodiments and methods of realization described in connection with the accompanying drawings, in which.

A DESCRIPTION OF THE PREFERRED EMBODIMENTS AND METHODS.

Figure 1:
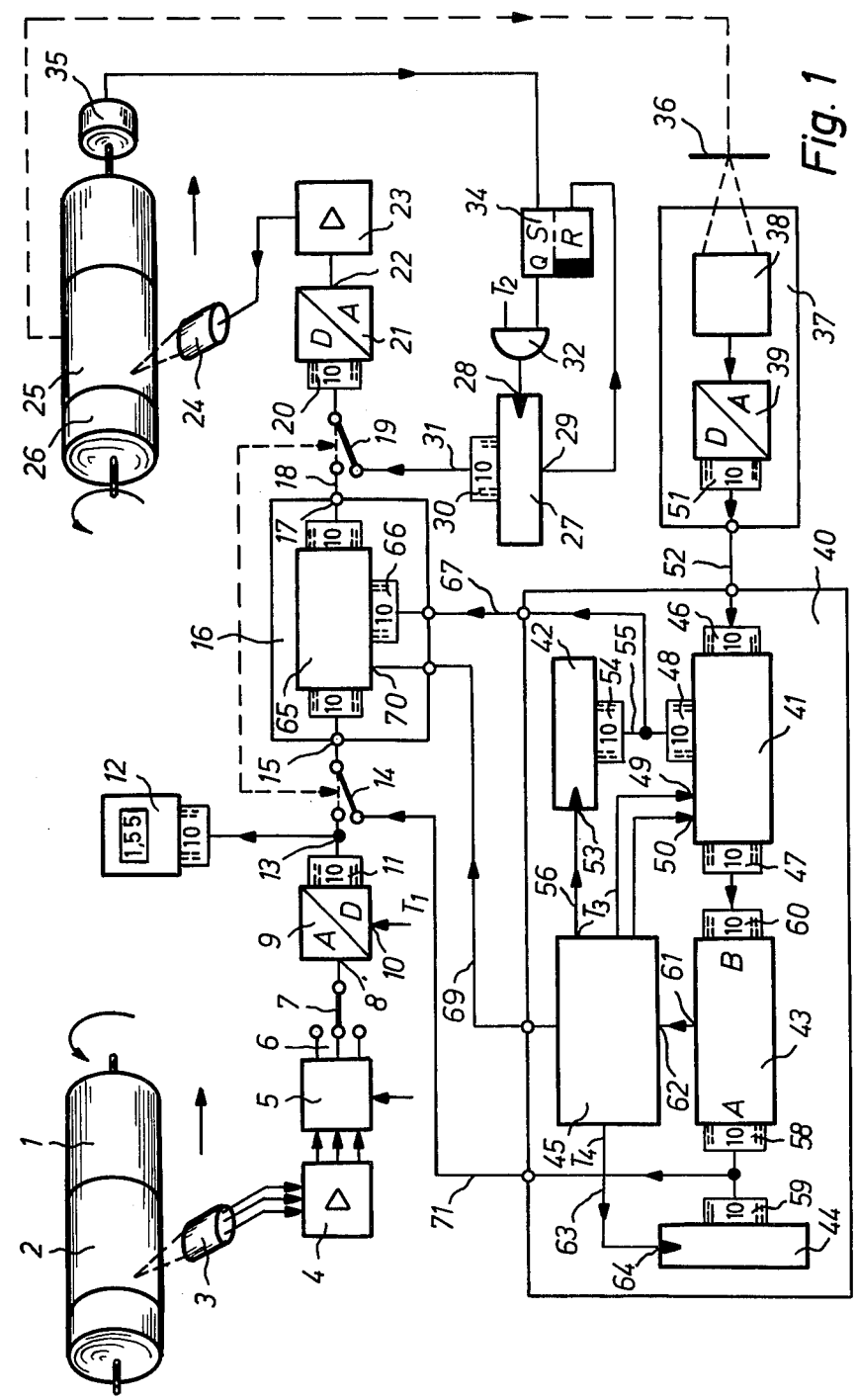
FIG. 1 is a diagrammatic representation of a calibration system according to the present invention.

With reference to FIG. 1, it is noted that it is a schematic illustration of a circuit embodying one principle of the arrangement and method according to the present invention for obtaining and storing correction data to correct non-linearities and, in which the correction data before they are used for the recording, are stored in a data storage device arranged in the signal path of the color component signals and during the recording are continuously read out instead of the data obtained from the scanning of the picture. In this manner, the recorded film densities correspond to the actually obtained film density.

More particularly, on a rotatable scanning drum 1, a color picture 2 is spanned which becomes scanned by a light point of a light source, as illustrated, point by point and from line to line. In the case of a frontal view picture, the reflected light and, in the case of a transparency-type picture, the transmitted light, will enter a scanning device 3, which is fed parallel with respect to the axis of the scanning drum 1. In the scanning device 3, there are produced three color component signals by color splitting with the aid of a color filter and by a photoelectric transducer. The color or sensor signals which represent the color components of the scanned picture points will go from the scanning device 3 over an amplifier 4 into a color operator 5. First, in the color operator 5, the logarithm of the color signals will be taken so that they are proportional to the scanned intensities of the color components of the picture 2. Subsequentially, in the color operator 5, the color correction will take place and the setting of the gradation. At the output terminals 6 of the color operator 5, one will obtain the corrected color component signals ready for the recording of the color components magenta, cyan, and yellow. The terminals 6 of the color operator 5 are coupled to a color component switch 7 with the help of which each time only one of the three color component signals is selected as a recording signal for the recording of a color separation.

The selected color signal component is coupled into the analog input 8 of an analog to digital converter 9 hereinafter called A/D. The digital conversion into shade numbers A is performed with the help of a scanning frequency $T_1$ which is fed to control input 10 of the A/D converter 9. The shade number A in the illustrated embodiment will appear as a ten digit binnary number at the digital outputs 11 of A/D converter 9.

The A/D converter 9 is adjusted in such a manner that the shade number A = 256 corresponds to the desired tone or shade value "white" and the shade number A = 767 corresponds to the desired tone or shade value "black" of a reference gray value scale. Between these above-mentioned characteristic shade numbers A, there are 509 further shade numbers which characterize the tone values of the reference gray scale.

The shade numbers A will appear as the desired film densities B of the reference gray wedge in a measuring instrument 12 which is coupled with the digital outputs 11 of the A/D converter 9. The relationship between the shade numbers A and the film densities B of the reference gray scale is defined by the following relationship:

$$B = \frac{A-256}{1000} \cdot 4$$

The tone value "white" will have the film density B = 0 associated therewith and the tone value "black" will have the film density $B$ = 2.044 associated therewith.

The ten digital outputs 11 of the A/D converter 9 are coupled over 10 conductors 13 and over a switch 14 with the inputs 15 of a correcting stage 16 according to the calibration or linearization circuit of the present invention.

For the sake of clarity, each of the multiple-lead conductors in the figures are represented as a single conductor and the actual number of the conductors present at the input or at the output of the functional blocks is indicated by a number.

The outputs 17 of the correcting stage 16 are coupled over conductors 18 and a further switch 19 which in turn is operatively coupled with switch 14, to a recording unit including a D/A converter, a final stage amplifier and a recording lamp. The switch 19 is connected to the digital input 20 of the D/A converter 21 of the recording unit.

In the D/A converter 21, the shade numbers C received from the corrector stage 16 are re-converted into an analog control signal. The control signal is fed from the analog output 22 of the D/A converter 21 onto the final amplifier stage 23 of the recording unit. The final stage 23 is coupled with the recording lamp 24, the brightness of which is modulated as a function of the control signal.

A film 25 is spanned on a rotating recording drum 26. The recording lamp 24 is moved axially along the recording drum 26 and exposes the film 25 point by point and line by line.

The exposed and developed film is designated herein as "color separation".

In the embodiment illustrated in FIG. 1, the linearization is performed before the recording of the color components and such linearization comprises several method steps. In the first step, in the broad aspect according to the present invention, a sample gray scale is exposed onto a film 25 having the same gradation or contrast curve. This sample gray scale possesses a predetermines range of gray values. Generally, it extends from "white" to "black". To this effect, the D/A converter 21 of the recording unit is fed with a number of voltage values scaled according to first signals corresponding to consecutive density values of the sample gray scale. To each voltage value and to each shading value of the sample gray scale, a shade number C is assigned.

In the illustrated embodiment of FIG. 1, the gray scale has 1024 density shades corresponding to the shade number C = O up to C = 1023.

Each shade number C is represented by a ten digit binary number, like

| C | = | 0 | = | 00000 | 00000 |
| C | = | 1 | = | 00000 | 00001 |
| C | = | 1023 | = | 11111 | 11111 |

The shade numbers C are selected in such a manner that the entire region of the characteristic film curve is covered.

With the 1,024 shade numbers C, a sample gray scale having 1,024 density values becomes exposed on the film. In the final stage 23 of the recording unit, the analog control signal becomes separated by a regulating arrangement in such a manner that the shade number C = O will correspond approximately to the film density D = O and the shade number C = 1023 will correspond approximately to the film density D = 2,044 and, as a result, with the 1,024 shade numbers, the entire region of the film characteristic curve becomes swept.

In order to call up the shade numbers C during the recording to the sample gray scale, a gray scale counter 27 is provided having a clock pulse input 28, a reset output 29 and ten outputs 30.

The gray scale counter 27 includes, for example, a plurality of cascaded units of the type SN 7493 manufactured by the Texas Instrument Company.

The output 30 on which the shade numbers C appear as ten digit binary numbers are over ten conductors 31 coupled over the switch 19 which, during the entire recording of the gray scale, remains in the indicated position, with the digital inputs 20 of the D/A converter 21.

The clock pulse input 28 of the gray scale counter 27 is supplied by a counting clock pulse $T_2$ and which clock pulses are controlled by means of a AND gate 32. The outer input of the AND gate 32 is connected to the Q output of a RS flip-flop 34 of the reset input R which is connected with the reset output 29 of the gray scale counter 27 and the set S input which is coupled with a pulse generator 35, which in turn, is connected with the axle of the recording drum 26.

To effect the recording of the gray scale, the recording drum 26 is set in rotation and the axial feed of the recording lamp 24 is started. The pulse generator 35 will deliver a pulse signal for each complete revolution of the recording drum 26 and at the very instant when the film 25 is to be exposed will be in the region of the recording lamp 24.

The pulse signal delivered upon the complete revolution of the drum will set the RS — flip-flop 34 and, the Q output of the RS flip-flop 34 will be in the H region, whereupon the AND gate 32 becomes set.

As a result, the counting clock pulse $T_2$ will start the operation of the gray wedge counter 27 which will call up one after the other, the shade numbers C from O up to 1,023. After 1,023 pulses have been read-in, the clock pulse train $T_2$ will deliver to the gray scale counter 27 over its reset output 29 a reset pulse whereupon the clock pulse train $T_2$ and the entire counting process is terminated.

With the delivery of each pulse representing a full rotation of the drum 26, a new counting cycle is commenced.

By simultaneously feeding the recording lamp 24 in the horizontal direction, a flat gray scale having 1,024 shade or grade numbers becomes illuminated onto the film 25. The width of the gray scale in the circumferential direction is defined by the length of the period of the counting pulse train $T_2$.

Instead of a gray scale counter 27, a step voltage generator can be employed. It would be coupled to the input of the final stage 23.

In the second step, in its broad aspect, according to the present invention, the obtained film densities D of the individual shades of the sample gray scale are measured on the illuminated and developed film 36 and the analog measured values of a third signal are digitalized in the form of shade numbers E.

For this purpose, there is provided a measuring device 37 which includes a densitometer 38 and a A/D converter 39 coupled to it.

The densitometer 38 delivers voltage values which are proportional to the measured density values and which density values in the A/D converter 39 become digitalized by being coded into shade numbers E. The shade numbers E are ten digit binary numbers. The A/D converter 39 is adjusted in such a manner that each shade number E corresponds to a predetermined region of the measured film density D.

| Region of the Film Densities D | | | Shade Number E | | | |
|---|---|---|---|---|---|---|
| 0.000 | – | 0.002 | 01000 | 00000 | $\hat{=}$ | 256 |
| 0.002 | – | 0.006 | 01000 | 00001 | $\hat{=}$ | 257 |
| . | | . | . | . | | . |
| . | | . | . | . | | . |
| . | | . | . | . | $\hat{=}$ | . |
| more than | | 2.042 | 10111 | 11111 | $\hat{=}$ | 767 |

By measuring the 1,024 gray shades of the gray scale, one will obtain 1,024 measured values in the form of shade numbers E.

It would also be possible to span the exposed and developed film 36 onto the scanning drum 1 and to perform the measuring of the gray scale with the help of the scanning device 3. In this case, one should consider the difference in the zones of dispersion of the optics of the scanning device 3 and of the densitometer 38.

The third broad step according to the present invention provides that the shade numbers E are stored in a storage device and, more particularly, each shade number E is stored under an address which is identical with the shade number C associated with an individual shade number E.

For this purpose, there is provided a computing arrangement 40 which includes a measured data storage device 41, an associated address counter 42, a comparator 43, a shade counter 44, and a control device 45.

The measured data storage device 41 had data inputs 46, data outputs 47, address inputs 48, a control input 49 for the signal write-in, and a control input 50 for the signal read-out.

The measured data storage device 41 should be able to accept, in the embodiment shown in FIG. 1, 1,024 words having ten bits each.

The digital outputs 51 of the A/D converter 39 are coupled over conductors 52 with the data inputs 46 of the measured data storage device 41.

The address counter 42 having a clock pulse input 53 and a ten output 54 is, for example, made up from several cascaded binary counters of the type 7490 manufactured by Texas Instrument Company. The ten outputs 54 of the address counter 42 are coupled over the conductor 55 with the address inputs 48 of the measured data storage device 41.

The clock pulse input 53 of the address counter 42 is supplied over a conductor 56 by a counting pulse series $T_3$ produced by the control device 45.

The address counter 42 calls up during a counting cycle, consecutively, the addresses O up to 1,023 as a ten position binary number corresponding to the shade numbers C of the gray wedge counter 27.

The storing of the measured data is performed as follows:

The density value of the first gray scale shade which is assigned the shade number C = O is measured with the measuring device 37 and the measured shade number $E_O$ is fed under the address O after a read-in instruction has been given to the control input 49 of the measuring data storage device 41.

Then, the address 1 of the measured data storage device 41 is selected. Next, the density value of the second gray scale shade to which the shade number C = 1 is assigned, becomes measured and the measured shade number $E_1$ is stored under the address 1 after a read-in instruction has been given. This process repeats itself until the shade number $E_{1023}$ obtained from the 1024 shade of the gray scale becomes stored under the address 1023.

After this, all shade numbers E become read-ins under the addresses of the measuring data storage device 41 and such addresses correspond to the shade numbers C with which the film densities D have been attained.

The measuring of the film densities D and the process of reading the measured data into the measured data storage device 41 could be automatized by spanning the gray scale, which is to be measured, onto a support which, with the help of a driving arrangement, could be moved step-wise always by a distance of two gray shades of the gray scale under the measuring optics of the densitometers. By the step-wise movement, one could control the counter pulse train $T_3$ for the address counter 42 and for the read-in instructions. The film densities D as represented by the shade numbers E must be equal to the indicated densities B by virtue of the linearization, the indicated densities being represented by the shade numbers A.

The fourth broad step of the method according to the present invention resides in that for each of the 511 possible shade numbers A between 256 and 767, by reading out the measured data storage device 41 and comparing the shade numbers, one may select the identical shade numbers E and note their addresses and store from them the identical shade numbers E. These addresses obtained by the above-identified step should be marked and they are the shade numbers C, which are called up during the reproduction of the picture, instead of the shade numbers A, and entered into the data inputs 20 of the D/A converter 21 inorder to obtain the indicated densities B as the fil densities D.

The obtaining of the shade numbers C is taken over by the computing circuit 40, together with the comparator 43, the shade or grade counter 44, and the control device 45. The A inputs 58 of the comparator 43 are coupled with the outputs 59 of the shade counter 44 and the B inputs 60 are coupled with the data outputs 47 of the measured data storage device 41.

The signal output 61 of the comparator 43 on which a signal appears at a time when the information on the B inputs 60 has reached or exceeded the information appearing on the A inputs 58, will be fed over a conductor 62 into the control device 45. The comparator 43 is made up from the elements SN 7485 manufactured by Texas Instrument Company.

The shade counter 44 made up from the elements SN7490 manufactured by Texas Instrument Company is controlled also by a further counter pulse train $T_4$ which is produced by the control device 45 and over a conductor 63 is fed into the clock pulse input 64 of the shade counter 44.

By the counter clock pulse train $T_4$, consecutively the 511 possible shade numbers A from 256 up to 767, of fourth signals are called up.

In the fifth step, in the broad aspect according to the present invention, the 511 shade numbers C of second signals of a first obtained in second group the computing arrangement 40 become stored in the correcting stage 16 under the addresses which correspond to the associated shade numbers A of the fourth signals of a first group. In order to perform this task, there is provided in the correcting stage 15, a corrected value storage device 63 which has a capacity of 1024 words, each being ten bits. The address inputs of the corrected value storage device 65 and the data outputs of the corrected value storage device 65 are identical with the outputs 17 of the correcting stage 16.

The data inputs 66 of the corrected value storage device 65 are coupled over conductors 67 with the address inputs 48 of the measured data storage device 41 in the computer circuit 40. The control device 45 delivers a read-in instruction over a conductor 69 onto a control input 70 of the corrected value storage device 65. The outputs 59 of the shade counter 44 are coupled over conductor 71 and over a switch 14 with the address inputs 15 of the corrected value storage device 65. During the linearization process, the switch 14 is in the illustrated position.

The obtaining of the shade numbers C for each of the 511 shade numbers A is performed as follows:

The shade counter 44 will call up the first shade number A = 256. This shade number A is available as information on the A inputs 58 of the comparator 43. The address counter 42 will call up now, one after the other, the addresses of the measured data storage device 41 and the stored shade numbers E become read-out by giving a read-out instruction from the control device 45 onto the control input 50 of the measured data storage device 41.

The read-out shade numbers E are available as information on the B inputs 60 of the comparator 43. If this information reaches or exceeds the signal information available on the A inputs 58, then the comparator 43 delivers a signal over the conductor 62 onto the control device 45 whereby the address counter 42 will stop and the sought after address becomes marked. This address will be delivered as shade number $C_{256}$ under the address 256 of the corrected value storage device 65 which becomes selected by the control device 45 over the conductor 69.

The shade counter 44 calls up next the second shade number A = 257. This shade number A will be compared with the stored shade number E. In the event there is a signal on the signal output 61 of the comparator 43, the corresponding address becomes marked and stored as shade number $C_{257}$ under the address 257 of the corrected value storage device 65.

This process will continue until the last shade number $C_{767}$ has been stored under the address 767 of the corrected value storage device 65.

As a result, 511 shade numbers C are stored in the corrected value storage device 65 and the linearization process is finished and now the reproduction of the picture can commence, whereupon the switch 14 and switch 19 are thrown into the dash line position.

It would also be possible to store only those corrected data in the corrected value data storage device 65 which resulted from the comparing or difference formation between the obtained shade numbers C and the called up shade numbers A.

Figure 2:
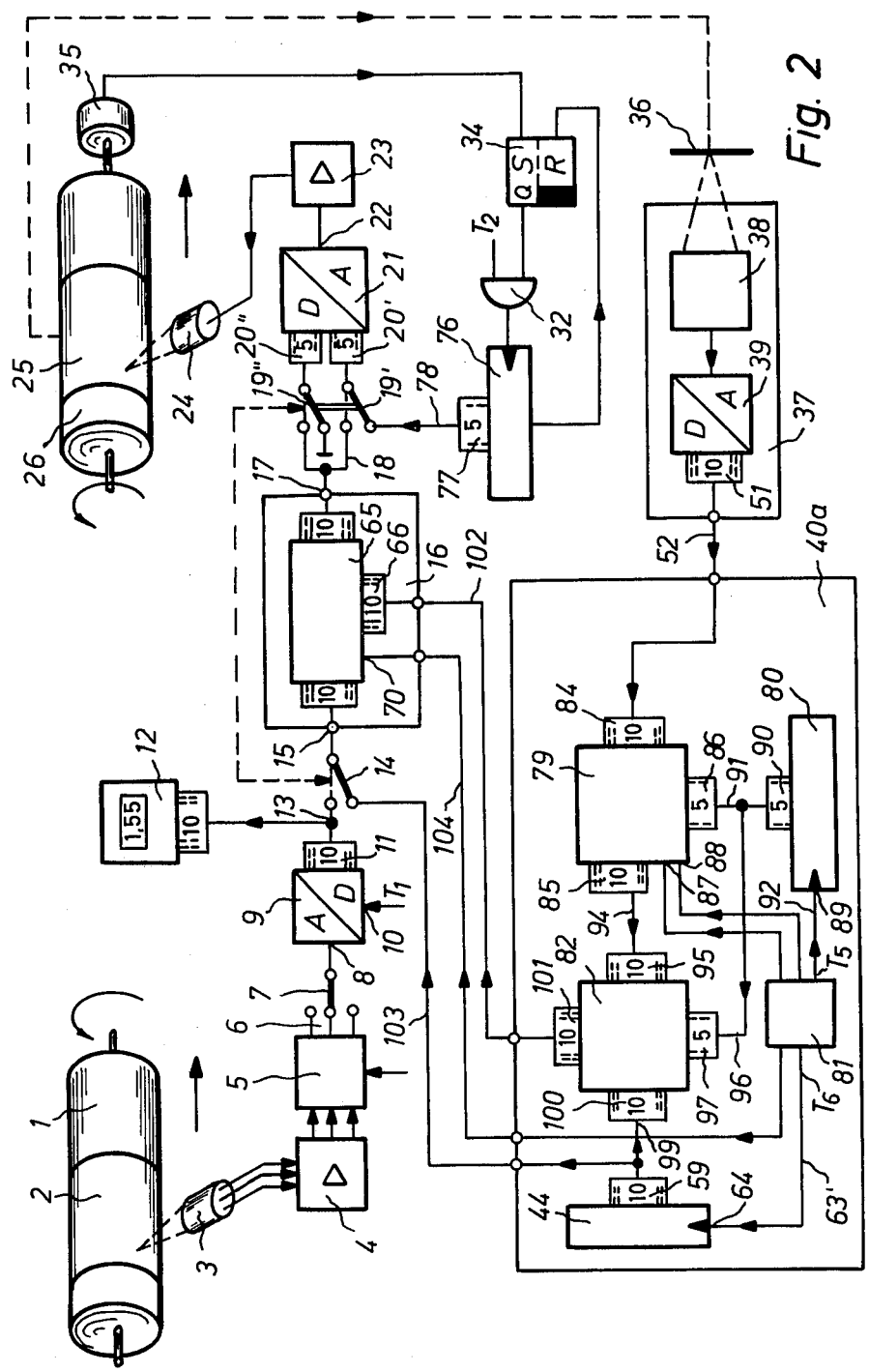
FIG. 2 is another system according to the present invention.

FIG. 2 is an illustration of another embodiment of the apparatus for obtaining and storing corrective value data for the linearization process according to the present invention. Before the recording of the picture, all the data which is to be stored in the corrected value data storing device 65 are formed by interpolation from the shade numbers E obtained by measuring the sample gray scale with a small number of gray shades or gradations.

Instead of a gray value scale having 1,024 shades in a modified first step according to the present invention, only a 32 shade gray scale becomes exposed or illuminated, the gray shades of which are corrected by the shade numbers F and during which the final amplifier 23 approximately covers the entire range of interest of the characteristic film curve. In the selected example, on the actual area of interest, during the reproduction, only about 16 measured density values will fall between the shade numbers A = 256 and A = 767. From these 16 measured density values, a computing circuit 40a can obtain the 511 necessary shade numbers C for storing in the corrected data storage device 65 of the correcting stage 16.

For recording a 32 shade gray value scale, the gray scale counter 27 of FIG. 1 is replaced by another gray scale counter 76, the five outputs 77 of which are coupled over a conductor 78 and over a first contact 19' of the switch 19 to the five high value inputs 20' of the D/A converter 21, while the five low value data inputs 20" are coupled over a second contact 19" of the switch 19 to ground potential. The contacts of the switch 19 are indicated in the five positions which are necessary for performing the linearization process, according to the present invention.

The gray scale counter 76 will call up for recording the gray scale shade numbers F from O to 31, consecutively. The shade numbers F are represented by a five position binary number each.

| | | | A | |
|---|---|---|---|---|
| F | = | 0 | $\not=$ | 00000 |
| F | = | 1 | $\not=$ | 00001 |
| F | = | 31 | = | 11111 |

As a result, on the data inputs 20', and 20" of the D/A converter 21, the following shade numbers C will be present, depending from the shade numbers F which have been called up by the gray scale counter 76. The shade numbers C are again represented by ten bit binary numbers:

| | | | | | | | A | |
|---|---|---|---|---|---|---|---|---|
| F | = | 00000 | C | = | 00000 | 00000 | $\not=$ | 0 |
| F | = | 00001 | C | = | 00001 | 00000 | $\not=$ | 32 |
| F | = | 11111 | C | = | 11111 | 00000 | = | 992 |

With the 32 shade numbers C, the gray scale becomes recorded on the film 25. The exposed film 25 will be developed and then it undergoes the measuring of the obtained film densities D with the help of the measuring arrangement 37 described in connection with FIG. 1.

In a second method step according to the present invention, the film densities D of the 32 shade numbers of the gray scale are measured on the exposed and developed film 36 and the analog measured data is converted into digital words in the form of shade number E. For this purpose, the measuring arrangement 37 is described in connection with FIG. 1 is used.

The third step, according to the present invention, provides again that the shade numbers E are stored in a storage device and each shade number E will be stored under an address which is identical to the shade number C assigned to each shade number E. For this purpose, the computer circuit 40a comprises a measured data storage device 79, an appropriate address counter 80, a control device 81, an interpolation stage 82, and a shade counter 44. The measured data storage device 79 has data inputs 84, data outputs 85, address inputs 86, a control input 87 for read-in instruction, and a control input 88 for the read-out instruction.

The measured data storage device 79 in the indicated embodiment of FIG. 2 may have a 32 word capacity at ten bits each.

The data outputs 51 of the A/D converter 39 of the measuring arrangement 37 are coupled over conductors 52 with the data inputs 84 of the measured data storage device 79.

The address counter 80 has a clock pulse input 89 and five outputs 90. The five outputs 90 of the address counter 80 are coupled over a conductor 91 with the address inputs 86 of the measured data storage device 79.

The clock pulse input 86 of the address counter 80 is supplied over a conductor 92 with a counter clock pulse train $T_5$ which is produced in the control device 81. The address counter 80 will call up, during a counting cycle, consecutively, the addresses 0 to 31 as five position binary numbers which correspond to the shade numbers F of the gray scale counter 76.

The process of the storing of the shade numbers E will be performed as follows:

The film densities D of the first gray scale shade to which the shade number F = O is assigned becomes measured with the help of the measuring arrangement 37 and the measured shade number E is stored under the address O by giving a read-in instruction onto the control input 87 of the measured data storage device 79.

Then, the address 1 of the measured data storage device 79 is called up by a clock pulse signal of the pulse train $T_5$ and the film density D of the second gray scale shade to which the shade number F = 1 is assigned, is measured.

By giving a further read-in instruction, the obtained shade number $E_1$ is stored under the address 1.

This process repeats itself until the shade number E obtained out of the 32 gray scale shades has been deposited or stored under the address 31.

The fourth method step according to the present invention, in its broad aspects, resides in each of the 511 possible shade numbers A between 256 and 767 calling up the measured data storage device 79 and comparing and selecting those shade numbers E which are identical to the shade numbers A and marking their addresses under which the identical shade numbers E are stored. Inasmuch as the address will match the shade numbers F called up by the gray scale counter 76, the shade numbers C will be found from the following relationship:

$$C = 32F \tag{1}$$

In the event there are no identical shade numbers E under the stored measured data, then the shade number C must be formed by interpolation during which the measured data storage device 79 is called up and comparing the shade numbers 30, stored shade numbers E''>A and E'<A, is selected and the associated addresses F'' and F' become marked. From the data E'', E', F'' and F', one will obtain the interpolated shade number C by using the following interpolation equation:

$$C = 32 \left[ F' + \frac{F'' - F'}{E'' - E'} (A - E') \right] \tag{2}$$

Inasmuch as F'' and F' are neighboring addresses, therefore, (F'' − F') = 1. As a result, the interpolation equation (2) will have the following simplified form:

$$C = 32 F' + 32 \frac{A - E'}{E'' - E'} \tag{3}$$

The shade numbers C are obtained in the interpolating stage 82 of the computer circuit 40a.

For the purpose of transferring the shade numbers A from the measured data storage device 79, the data outputs 85 of the measured data storage device 79 are coupled over conductors 94 with the data inputs 95 of the interpolation stage 82. In addition, the five address inputs 86 of the measured data storage device 79 are coupled over conductors 96 to the first address inputs 97 of the interpolation stage 82. Over the conductors 96, the addresses F selected by the address counter 80 are transmitted onto the interpolation stage 82. In order to call up the shade numbers A, the outputs 59 of the shade counter 44 are coupled over conductors 99 with the second address inputs 100 of the interpolation stage 82.

The shade counter 44 is contolled by a counter clock pulse train $T_6$ which is produced by the control device 81 and is supplied over a conductor 63' onto the clock pulse input 64 of the shade counter 44.

With the help of the counter clock pulse train $T_6$, the shade numbers A are called up consecutively.

According to a fifth step of the present invention, the shade numbers C formed in the interpolation stage 82 are stored in the corrected data storage device 65 of the correcting stage 16 under addresses which are identical to the shade numbers A which have been just called up.

The outputs 101 of the interpolation stage 82 are coupled over conductors 102 with the data inputs 66 of the corrected data storage device 65. The outputs 59 of the shade counter 44 are coupled over conductors 103 and over a switch 14 with the address inputs 15 of the corrected data storage device 65 in order to be able to select the addresses of the corrected data storage device 65. The read-in instruction given by the control device 81 will reach control input 70 of the corrected data storage device 65 over the conductors 104.

The process of storing of the corrected data into the corrected data storage device 65 of the correcting stage 16 has been already discussed in detail in connection with FIG. 1.

Figure 3:
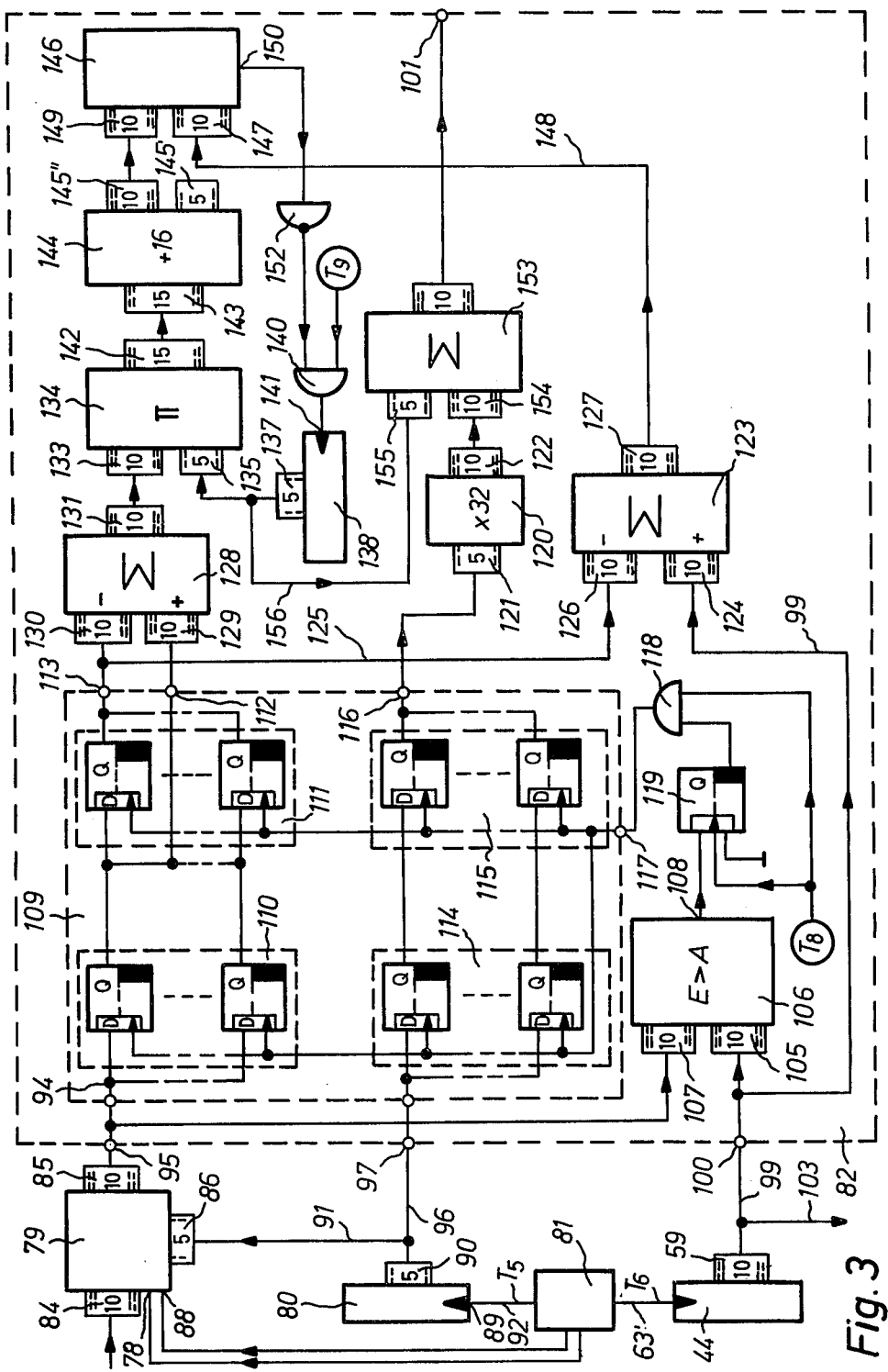
FIG. 3 is a circuit diagram illustrating an interpolation circuit according to the present invention.

FIG. 3 illustrates in more detail the interpolation stage 82.

The process of interpolation will now be described in more detail. The shade counter 44 call up, for example, one of the 511 shade numbers A. The called up shade number A will reach over conductor 99 and the second address inputs 100 of the interpolation stage 82, the inputs 105 of a comparing stage 106. For comparing the shade number A with a shade number E which has been stored in the measured data storage device 79, the address counter 80 will select, with the help of the counter clock, pulse train $T_5$, consecutively, the addresses of the measured data storage device 79. After receiving the read-out instruction from the control device 81, on the control input 88 of the measured data storage device 79, the shade numbers E will be read-outs which are stored under the addresses which have been called up. The read-out shade numbers E will reach over the data inputs 95 of the interpolation stage 82, the inputs 107 of the comparing stage 106. In the comparing stage 106, the shade numbers E and the shade numbers A will be compared for A where E > A. If E > A, then the signal output 108 of the comparing stage 106 will go into the higher H region.

The shade number E'', which has been just read-out and the earlier read-out shade number E', and the associated addresses F'' and F', are stored for a short period of time in an operational storage device 109 of the interpolations stage 82.

The operational storage device 109 is made up from D-type flip-flops, for example, of the type SN 7474 (Texas Instrument Company). For the above-noted intermediate storage of the shade numbers E'' and E', the ten outputs 85 of the measured data storage device 79 will be coupled over cnductors 94 to the information inputs of ten D-flip-flops of a first group 110. The Q outputs of the D-flip-flops of the first group 110 are coupled with the information inputs of ten further D-flip-flops of a second group 111. On the Q outputs of the D-flip-flops of the first group 110, which are identical with the outputs 112 of the operational storage device 109, will appear the shade number E'' and on the Q outputs of the D-flip-flops of the second group 111, which are identical with the outputs 113 of the operational storage device 109, will appear the shade number E'.

For the intermediate storage of the associated addresses F'' and F', the five outputs 90 of the address counter 80 are coupled over the first address inputs 97 of the interpolation stage 82 with the information inputs of five D-flip-flops of a third group 114 of the operational storage device 109. The Q outputs of the D-flip-flops of the third group 114 are coupled with the information inputs of five further D-flip-flops of a fourth group 115. On the Q outputs of the D-flip-flops of the fourth group 115 which correspond also the outputs 116 of the operational storage device 109, will appear the selected address, as the shade number F'. In the individual groups, there are in each only a pair of D-flip-flops illustrated. The clock pulse input of all D-flip-flops of the operational storage device 109 are coupled with each other and are lead to a control input 117 of the operational storage device 109.

The receiving of the information in the D-flip-flops occurs with the help of a clock pulse train $T_8$, which over a AND gate 118 will reach the control input 117 of the operational storage device 109. The AND gate 118 is controlled by a flip-flop 119. In the event, during the comparing of the shade numbers A and E, the E > A is obtained, then the Q output of the flip-flop 119 will go over into its lower L region and AND gate 118 will be closed to further pulses of the clock pulse train $T_8$. During this, the values E''', E' and F' which have been just stored for the intermediate time, are marked, and one will commence the interpolation.

The formula (3) used for computing the shade numbers C actually represents the summation of terms $C_1$ and $C_2$, wherein $$C_1 = 32F' \text{ and } C_2 = \frac{(A - E')\,32}{E'' - E'}$$

The term $C_1$ is obtained by the multiplication of the shade number F' with a factor 32 in a multiplication stage 120, the input 121 of which is coupled with the output 116 of the operational storage device 109. The multiplication means that the five-position shade number F', which already corresponds to the five high-value positions of the ten bit term $C_1$, will be given five low value positions which are equal to 0. At the output 122 of the multiplication stage 120, one will have available the term $C_1 = 32F'$.

In order to compute the term $$C_2 = \frac{(A - E')\,32}{E'' - E'},$$

the last equation can be changed into the following form:

$$A - E' = \frac{(E'' - E')C_2}{32} \tag{4}$$

The expression (A−E') is formed in a subtraction stage 123. The shade number A which has been called up by the shade counter 44 will be delivered over a conductor 99 to the positive input 124 of the substraction stage 123, while over a conductor 125, the shade number E' will be delivered from the output 113 of the operational storage device 109 onto the negative input 126 of the subtraction stage 123. At the output 127 of the subtraction stage 123 will then appear the difference (A−E').

The difference (E''−E') is formed in a further subtraction stage 128. For this purpose, the shade number E'', available at the output 112 of the operational storage device 109, will be delivered to the positive input 129 of the subtraction stage 128 and the shade number E', available at the output 113 of the operational storage device 109, will be delivered to the negative input 130. At the output 131, there will appear the difference (E''−E').

The difference (E''−E') according to equation (4) must be multiplied by the unknown factor $C_2$. For this purpose, the output 131 of the subtraction stage 128 is coupled with the input 133 of a multiplicator 134, the second input 135 of which is coupled with the output 137 of a counter 138. The counter 138 is controlled by a further clock pulse train $T_9$ which reaches the clock pulse input 141 of the counter 138 over a AND gate 140. During an interpolation process, the counter 138 will call up starting with zero and increasing from there the five position shade numbers G which become continuously multiplied in the multiplicator 134 with the difference (E''−E') whereby the product G (E''−E') is obtained as a 15-bit binary number and will appear at the output 142 of the multiplicator 134.

This product, according to equation (4), must be divided by the factor 32. The division will be performed by deducting the five low value positions. In order to keep the error of this computing as low as possible, one will round off the result in a known manner but, before the above noted dropping of the low value positions, the number 16 will be added to the product. For this purpose, the outputs 142 are coupled with the input 143 of an adding stage 144, in which the number 16 is added.

The deducting or rounding means that the five low value outputs 145' will not be observed, while on the high value output 145" the expression $$\frac{G(E'' - E')}{32}$$

will appear.

In order to obtain the yet unknown term $C_2$, the expressions $(A - E')$ and $$\frac{E'' - E')G}{32}$$

are continuously compared in a comparator 146, the first comparing input 147 of which is coupled over a conductor 148 with the output 147 of the subtraction stage 123 and the second comparing input 149 of which is coupled with the output 145" of the adding stage 144.

When the information appearing on the comparing input 147 of the comparator 146 will reach or exceed the information appearing on the comparing input 149, then the signal output 150 will go into its H region, whereby the AND gate 140 becomes blocked through the inverter 152 and the clock pulse train $T_9$ will be discontinued.

As a result, the just selected shade number G becomes fixed. This fixed shade number G is the term $C_2$ which will satisfy the equation (4).

During the computing process, the addition of the terms $C_1$ and $C_2$ will follow next in an adding stage 153, the first input 154 of which is coupled to the output 122 of the multiplication stage 120, and the second input 155 of which is coupled over a conductor 156 to the output 137 of the counter 138. On the output 101 of the interpolation stage 82, there will appear the desired shade number C which will be stored in the corrected data storage device 65 of the correcting stage 16.

Thereafter, the shade counter 44 will call up the next shade number A, to which then a further shade number C will be obtained and stored.

In the event a shade number A will coincide with a shade number E', which has been stored in a measured data storage device 79, then there is no need for the interpolation process. At the output 127 of the subtraction stage 123, the difference $A - E' = O$ will appear and the signal output 150 of the comparator 146 will be in its H-region, thereby the counter 138 will not start operating at all. As a result, the term $C_2$ will equal 0 and the output 101 of the interpolation stage 82 will deliver the desired shade number as being $C = 32.F'$.

This process will repeat itself until for all the 511 shade number A, the shade numbers C have been stored in the corrected data storage device 65. Then, the reproduction of the picture may commence.

Figure 4:
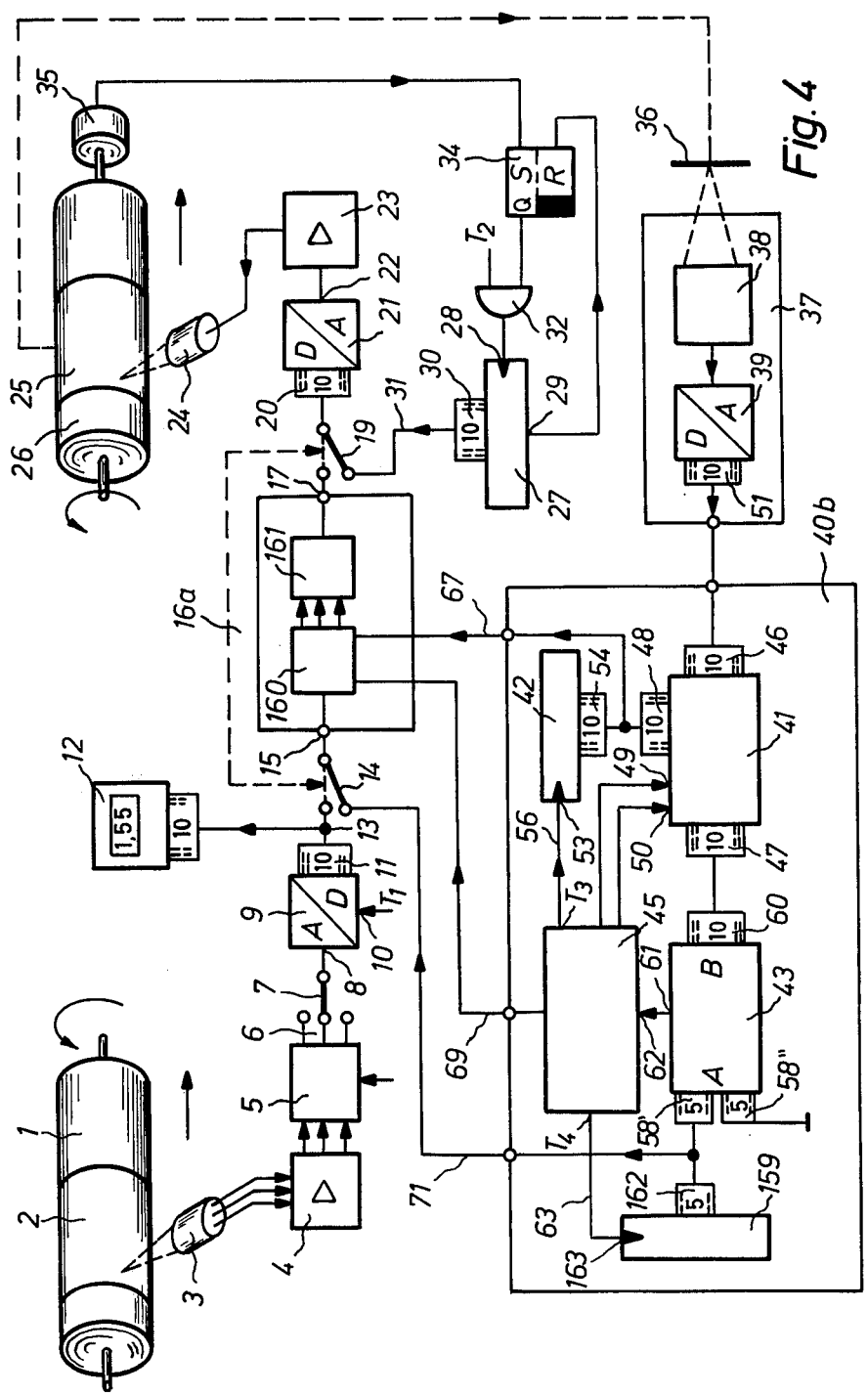
FIG. 4 is a circuit diagram similar to FIGS. 1 and 2 enabling to practice a further principle of the method according to the present invention.

With reference to FIG. 4, which shows a further embodiment of an apparatus for obtaining the corrected data for the linearization according to the present invention, it is noted that all corrected data are formed during the recording by means of interpolation from the shade numbers E obtained by performing the measurements on the sample gray scale.

The first and second steps according to the present invention reside again in that a 1024 shade-containing gray scale is recorded and the obtained film densities D are determined in the form of shade numbers E, with the help of the measuring arrangement 37. The performing of the first and second steps, according to the present invention, has been already described in detail in connection with FIG. 1.

According to the third step of the method according to the present invention, each of the 1024 shade numbers E are stored under an address which corresponds to the shade numbers C, with which the density measured data has been obtained.

For this purpose, there is provided again a computing circuit 40b, comprising a measuring data storage device 41, an associated address counter 42, a comparator 43, a control device 45, and a shade counter 159. The storing of the shade numbers E in the measured data storage device 41 has been already described in detail in connection with FIG. 1.

In the fourth step of the method according to the present invention, in contrast to the method step described in connection with FIG. 1, the shade numbers C, before reproduction, are not obtained for all 511 shade numbers A which lie between 256 up to 767, but only, for example, for 17 shade numbers A.

The fifth step of the method according to the present invention resides in that the 17 shade numbers C are stored in a storage device 160 of a correcting stage 16a under the addresses which are identical with the associated shade numbers A.

A sixth step of the method according to the present invention resides in that, during the reproduction, from the 17 stored shade numbers C, the shade numbers C necessary for the 511 possible shade numbers A are obtained through interpolation in an interpolating stage 161 of the correcting stage 16a.

The above-noted method steps are described in the following in more detail.

For obtaining the 17 shade numbers C, the five outputs 162 of the shade counter 159 are coupled to the five high value information inputs 58' of the comparator 43, while the five low value information inputs 58" will not be observed.

The shade counter 159 will call up, with the help of a clock pulse train $T_4$, which is produced by the control device 45, and is fed over the conductor 63 to the clock input 153 of the shade counter 159, one after the other, the numbers 01000, 01001, up to 1100. On the A input 58", and 58" of the comparator 43, there will appear then, depending on which numbers have been selected by the shade counter 159, the following 17 shade numbers A:

| | | | A | |
|---|---|---|---|---|
| 1. | 01000 | 00000 | ☆ | 256 |
| 2. | 01001 | 00000 | ☆ | 288 |
| 17. | 11000 | 00000 | = | 768 |

With the first pulse of the clock pulse train $T_4$, the first shade number $A = 256$ can be called up. The address counter 42 will select, by the clock pulse train $T_3$, one after the other, the addresses of the measured data storage device 41. The shade numbers E, which have been stored under the selected addresses, will be read-out through a read-out instruction given to the control input 50 of the measured storage device 41, and in the comparator 43, they become compared with the called up shade numbers $A = 256$.

In the event the information on the B input 60 of the comparator 43 has reached or exceeded the information on the A inputs 58' and 58", then the comparator 43 will deliver a signal over the signal output 61 into the control device 45, whereupon the address counter 42 becomes stopped and the address will be marked, under which the shade number E, identical to the shade number A, has been stored. Such marked address is the sought after shade number C. Simultaneously, the shade counter 159 over the conductor 71, switch 14, and over the input 15 of the correcting stage 16', which corresponds to the address input of the storage device 160, will select an address of the storage device 160, which is identical with the called up shade number A.

Through a "write" instruction given by the control device 45 over the conductor 69, the shade number $C_{256}$ will be stored under the address 256 of the storage device 160.

Through a further pulse of the clock pulse train $T_4$, next the shade number A = 288 will be called up and will be compared with the shade number E stored in the measured data storage device 41. The address obtained as a result of the comparison is the shade number $C_{288}$, which will be stored under the address 288 of the storage device 160. This process will be carried on until all 17 shade numbers, from $C_{256}$ up to $C_{767}$, become stored under appropriate addresses of the storage device 160.

Now, the reproduction of the picture may commence. For this purpose, the switches 14 and 19 are in the indicated dashed position, whereby the outputs 11 of the A/D converter 9 are coupled with the input 15 of the correcting stage 16a and the output 17 thereof is coupled with the data inputs 20 of the D/A converter 21.

Corresponding to the tone or gray value of the just scanned picture point of the picture, there appears on the input 15 of the correcting stage 16a, one of the 511 possible shade numbers A. From these shade numbers and the stored shade numbers C, the necessary shade number C will be obtained by interpolating in the interpolation stage 161. The interpolation will be described in more detail in connection with FIG. 5.

Figure 5:
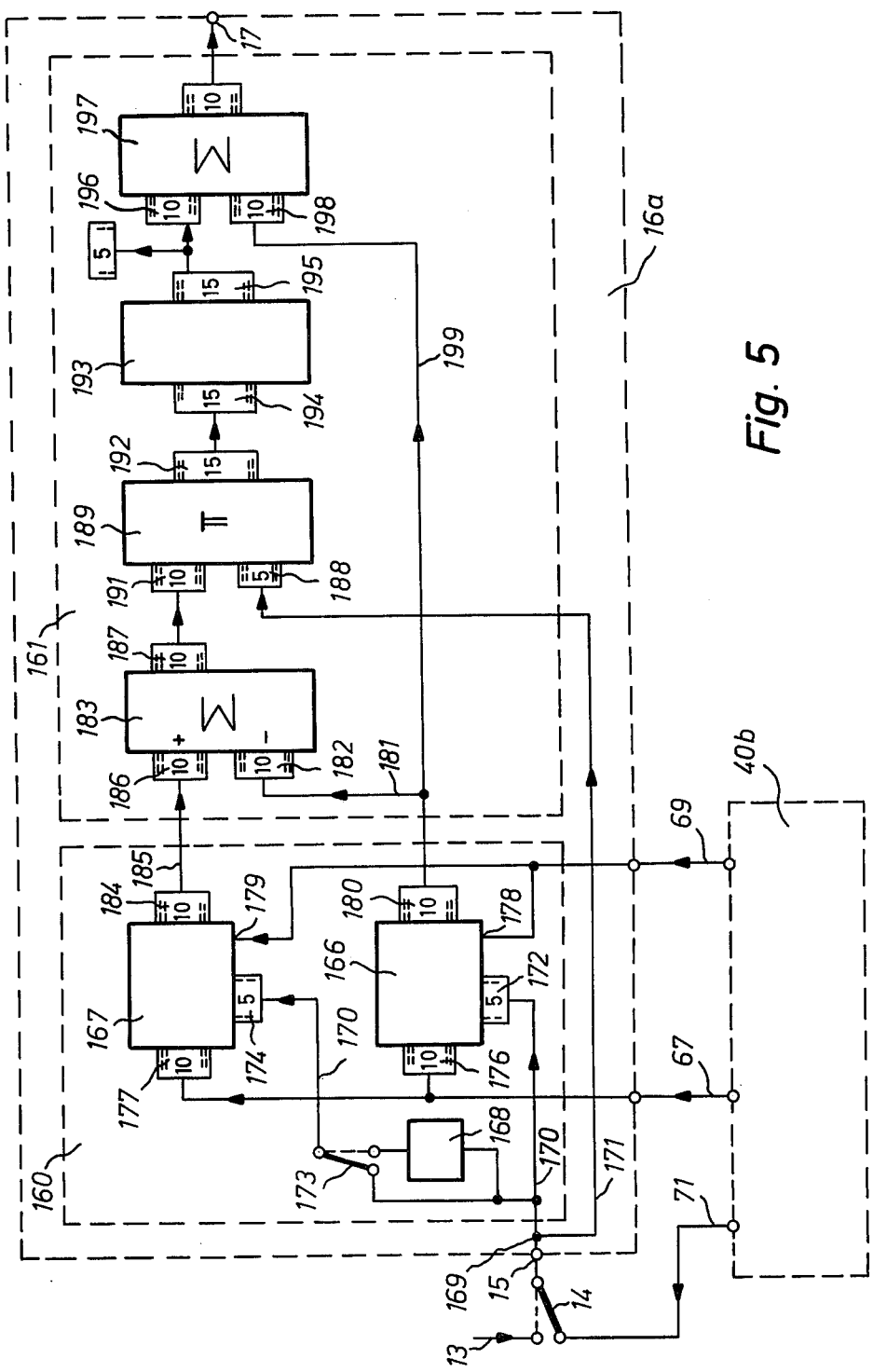
FIG. 5 is a circuit diagram illustrating an interpolation circuit embodying principles of the present invention.

With reference to FIG. 5, it is noted that it shows details of the correcting stage 16a, including the storage device 160 and the interpolation stage 161.

The storage device 160 includes two operational storage devices 166 and 167 and an ading stage 168 for increasing addresses.

The computing circuit 40b is connected over the conductor 71 and switch 14 and over the input 15 of the correcting stage 16a, with a branch point 169. At the branch point 169, the ten-load conductor 71 is subdivided into a pair of five-lead conductors 170 and 171. Over the conductor 170, the five high value bits of the shade number A will reach the address inputs 172 of the operational storage device 166 and over a switch 173, they reach the address inputs 174 of the second operational storage device 167.

Over the conductor 67, which is coupled with the data inputs 176 and 177 of the operational storage devices 166 and 167, the 17 shade numbers C, after a "write" instruction, have been delivered over the conductor 69 into the control inputs 178 and 179 of the operational storage devices 166 and 167, the 17 shade numbers C obtained in the computer circuit 40b will be stored in the operational storage devices 166 and 167 under the addresses called up by the shade counter 159. During this process, the switch 173 will be in the indicated position.

From the shade numbers C, stored in the operational storage devices 166 and 167, the necessary 511 shade numbers C are computed during the reproduction of the picture by interpolation in the interpolating stage 161, and will be further processed for the recording.

During the reproduction, the switches 14 and 173 are in the indicated dashed position.

On the input 15 of the correcting stage 16a, a shade number A will appear, from which the appropriate shade number C will be calculated by interpolation, according to the equation:

$$C = C' + \frac{C'' - C'}{A'' - A'} (A - A') \qquad (5)$$

In this equation, C' and C" are values which are adjacent to the value C and are stored as shade numbers, while A' and A" are the associated addresses. Inasmuch as the shade counter 159 will call up, one after the other, the numbers 256, 288, up to 768, the $A'' - A' = 32$, and the equation, (5), becomes simplified as follows:

$$C = C' + \frac{(C'' - C')(A - A')}{32} \qquad (6)$$

The interpolation circuit 161 will perform the computation according to equation (6).

The process of interpolation will occur as follows:

The five high value bits of the shade numbers A, which have been called up during the reproduction, and which reach over switch 14, the address inputs 172 of the operational storage device 166, correspond to the selected addresses of the operational storage device 166. Under these addresses are stored the shade numbers C'. Simultaneously, with the help of the adding stage 168, by adding a "one" to the selected address of the operational storage device 166, an address increase is performed for the second operational storage device 167.

Under the address which has been increased by "one" in the second operational storage device 167, the shade number C" is stored.

For forming the difference, the data outputs 180 of the operational storage device 166 are coupled over a conductor 181 with the negative input 182 of a subtraction stage 183 and the data outputs 184 of the operational storage device 167 are coupled over a conductor 185, with the positive input 186 of the subtraction stage 183. At the output 187 of the subtraction 183 will appear the difference (C"−C'). This difference according to equation (6) must be multiplied by the expression (A−A'). For this purpose, the five low value bits of the shade numbers A are fed from the branch point 169 over the conductor 171 to the first input 188 of a multiplier 189 and, the difference (C"−C') from the output 187 of the subtraction stage 183 is fed onto the second input 191 of the multiplier 189. At the output 192 of the multiplier 189, there will appear the product (C"−C'). (A−A') as a 15-bit binary number. This product, after dropping five low value bits, will be divided by the number 32. In order to keep the error small during the division, one will perform a rounding operation in a known manner according to which, before the dropping of the low value bits, the number 16 will be added to the product in an adding stage 193. For this purpose, the output 192 of the multiplier 189 is coupled with the input 194 of the adding stage 193. The five low value bits of the product will not be observed at the output 195 of the adding stage 193, while the ten high value bits which correspond to ratio $$\frac{(C'' - C')(A - A')}{32}$$

will be fed to the input 196 of a further adding stage 197.

In the adding stage 197, to the above ratio, the number C' will be added. For this purpose, the second input 198 of the adding stage 197 is coupled over conductor 199, with the data outputs 180 of the operational storage device 166.

The output of the adding stage 197, which is identical with the output 17 of the correcting stage 16a, will deliver the shade number C, which has been computed according to the equation (6).

Figure 6:
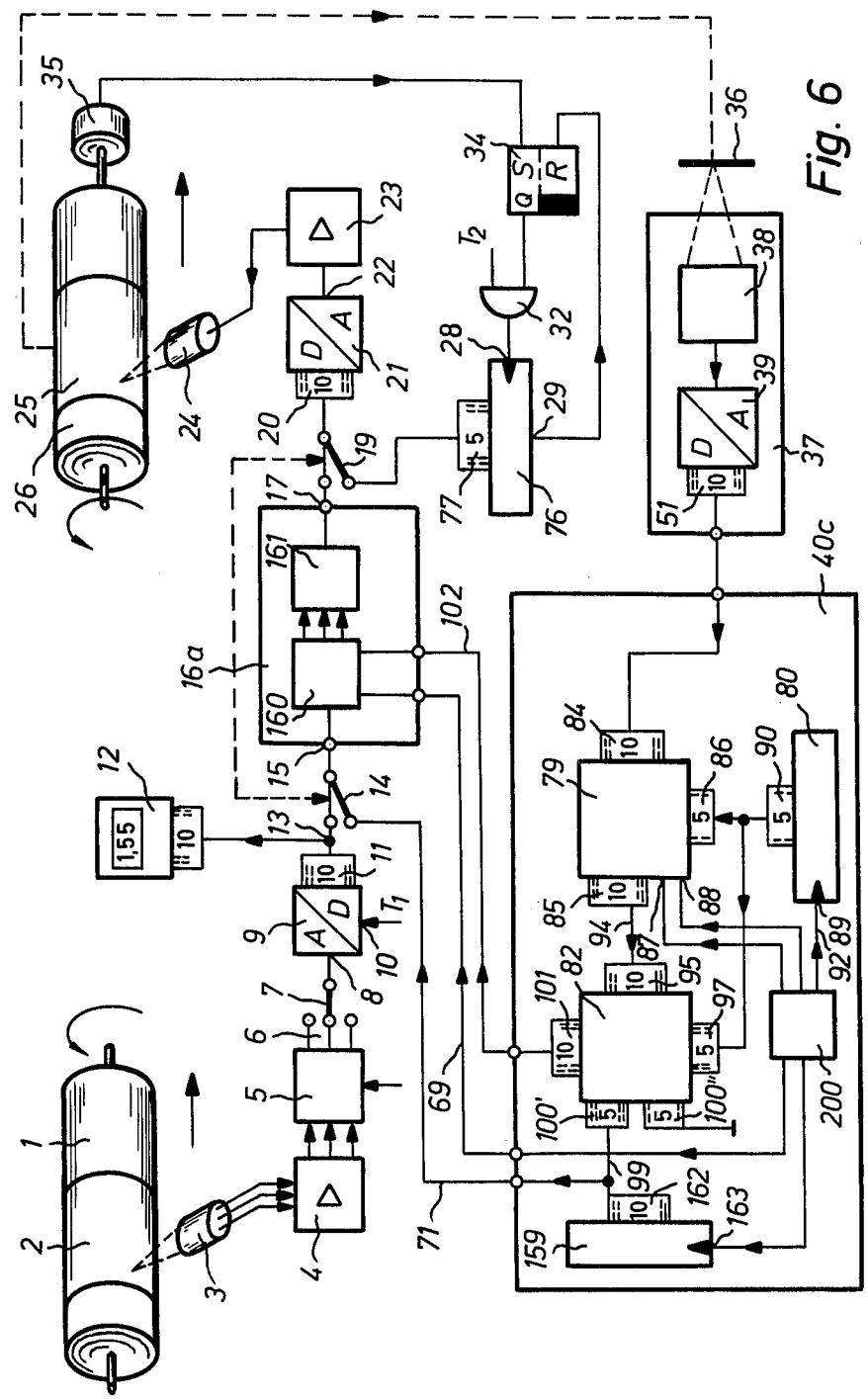
FIG. 6 is an illustration similar to FIGS. 1, 2 and 3 enabling to practice still further principles of the method according to the present invention.

Referring now to FIG. 6, it is noted that it illustrates a further embodiment of an apparatus according to the present invention for obtaining corrected data for the linearization, and in which one will obtain, after a first interpolation process before the reproduction, some shade numbers C serving as aiding data for the interpolation. During the subsequent reproduction, there will be the formation of the rest of the shade numbers C from the data by performing a further interpolation.

The embodiment according to FIG. 6 includes, among others, the correcting stage 16a having a storage arrangement 160 and the interpolation stage 161 and the computing circuit 40c having a measured data storage device 79 with an associated address counter 83, an interpolation stage 82, a shade counter 169, and a control device 200. As has already been described in more detail in connection with FIG. 2, next, before reproduction, with the help of a gray scale counter 76, a 32-position sample gray scale will be exposed onto the film 25. The exposed and developed film 36 will be measured with the measuring arrangement 37 and a film density will be digitalized into shade numbers E. The shade numbers E will be stored in the measuring data storage device 29 of the computer 40c.

The shade counter 159 will call up, in a further step according to the present invention, similarly as described in connection with FIG. 4, only some of the possible shade numbers A, for which the associated shade numbers C have been obtained by interpolation from the 32 shade numbers E stored in the measured storage device 79. The shade numbers C obtained in such a manner will be used and read-into the storage device 160 of the correcting stage 16a as aiding data. Then, during the reproduction of the picture, with the help of the interpolation stage 161, the necessary shade numbers will be obtained from the stored aiding data. This process has also been described in more detail in connection with FIG. 4.

As has already been mentioned above, the method according to the present invention will find also application in the event when only the indication of the density values becomes linearized.

I wish it to be understood that I do not desire to be limited to the exact details of construction shown and of the method described, for obvious modifications will occur to a person skilled in the art.

Having thus described the invention, what I claim as new and desire to be secured by Letter Patent, is as follows:

1. A method of calibrating a reproduction apparatus having a sensor device for generating sensor signals by optically scanning a picture original and a recording device controlled by recording signals for recording the picture original on a film, comprising the steps;

generating a set of first signals for said recording device to produce a sample gray scale on the film having a predetermined first range of gray scale values;

generating and storing a set of second signals corresponding respectively to said first signals;

generating a set of third signals corresponding substantially to the gray scale values of said sample recorded gray scale;

correlating said third signals to said first signals;

generating a set of fourth signals representing a predetermined second range of gray scale values of a reference gray scale;

substantially correlating a first group of at least some of said fourth signals to a second group of at least some of said third signals for obtaining said second signals; and storing said second signals in a storage device having addresses corresponding to the fourth signals of said first group, whereby a substantially generated sensor signal for a given gray scale value by the picture original can be used to select a recording signal from a stored second signal of said second group by a correlated fourth signal suitable for obtaining a substantially duplicate gray scale value.

2. A method as claimed in claim 1, wherein said first, second, third, and fourth signals are in the form of digital signals.

3. The method as claimed in claim 1, wherein said first and second gray scale values extend over the same range of gray values.

4. The method as claimed in claim 3, wherein said gray values extend from "white" to "black".

5. The method as claimed in claim 1, wherein said step of correlating said first and second groups comprises the step of selecting a fourth signal and comparing it to said third signals until substantial equality is obtained for a given third signal, and then storing the second signal corresponding to said given third signal.

6. The method as claimed in claim 1, wherein the correlation of said first and second groups is carried out through the use of interpolation.

7. The method as claimed in claim 1, wherein said set of first signals is generated through the use of a step voltage generator.

8. A method as claimed in claim 1, wherein said set of first signals is generated through the use of an optical-electrical scanning of a gray scale.

9. An apparatus for callibrating a reproduction apparatus having a sensor device for generating sensor signals by optically scanning a picture original and a recording device controlled by recording signals for recording the picture original on a film, comprising in combination:

first means operable for generating a set of first signals for said recording device to produce a sample gray scale on the film having a predetermined first range of gray scale values;

second means operable for generating and storing a set of second signals corresponding respectively to said first signals;

third means operable for generating a set of third signals corresponding substantially to the gray scale values of said recorded sample gray scale;

fourth means operable for correlating said third signals to said first signals;

fifth means operable for generating a set of fourth signals representing a predetermined second range of gray scale values of a reference gray scale;

sixth means operable for substantially correlating a first group of at least some of said fourth signals to a second group of at least some of said third signals for obtaining said second signals;

a storage device; and seventh means operable for storing said second signals in said storage device having addresses corresponding to the fourth signals of said first group, whereby a substantially generated sensor signal for a given gray scale value by the picture original can be used to select a recording signal from a stored second signal of said second group by a correlated fourth signal suitable for obtaining a substantially duplicate gray scale value.

* * * * *